United States Patent
Keithly et al.

(10) Patent No.: US 6,942,883 B2
(45) Date of Patent: *Sep. 13, 2005

(54) ENHANCING COMMERCIAL POULTRY OPERATIONS WITH LITTER HAVING CITRUS BYPRODUCT

(76) Inventors: James H. Keithly, 619 Casabella Dr., Bradenton, FL (US) 34209; Thomas Taggart, 5202 34th Ave. W., Bradenton, FL (US) 34209; David L. Wilson, P.O. Box 481, Jefferson, GA (US) 30549

(*) Notice: Subject to any disclaimer, the term of this patent is extended or adjusted under 35 U.S.C. 154(b) by 0 days.

This patent is subject to a terminal disclaimer.

(21) Appl. No.: 10/671,409

(22) Filed: Sep. 25, 2003

(65) Prior Publication Data

US 2004/0058020 A1 Mar. 25, 2004

Related U.S. Application Data

(62) Division of application No. 10/341,729, filed on Jan. 14, 2003, now Pat. No. 6,708,647, which is a division of application No. 09/898,997, filed on Jul. 3, 2001, now Pat. No. 6,523,496.

(51) Int. Cl.[7] ................................................ A23K 1/00
(52) U.S. Cl. ............................ 426/2; 119/171; 424/736
(58) Field of Search ...................... 426/2, 69; 119/347, 119/416, 417, 171–173; 424/736

(56) References Cited

U.S. PATENT DOCUMENTS

| | | | |
|---|---|---|---|
| 2,597,457 A | 5/1952 | Cook | |
| 2,708,418 A | 5/1955 | Sugarman et al. | |
| 3,816,577 A | 6/1974 | Neckermann et al. | |
| 4,308,825 A | 1/1982 | Stepanian | |
| 4,386,580 A | 6/1983 | Johnson | |
| 4,424,763 A | 1/1984 | Johnson | |
| 4,465,019 A | 8/1984 | Johnson | |
| 4,531,518 A | 7/1985 | Johnson | |
| 4,676,196 A | 6/1987 | Lojek et al. | |
| 4,727,824 A | 3/1988 | Ducharme et al. | |
| 4,737,582 A | 4/1988 | Goldman et al. | |
| 4,840,792 A | 6/1989 | Joulain et al. | |
| 4,883,021 A | 11/1989 | Ducharme et al. | |
| 5,054,434 A | 10/1991 | Wax et al. | |
| 5,110,804 A | 5/1992 | Lee | |
| 5,230,305 A * | 7/1993 | House ........................ 119/171 |
| 5,240,699 A | 8/1993 | Osada et al. | |

(Continued)

FOREIGN PATENT DOCUMENTS

| DE | 196 17 224 A1 | 11/1997 |
|---|---|---|
| WO | WO 98/27261 | 6/1998 |
| WO | WO 03/003818 A2 | 6/2002 |

OTHER PUBLICATIONS

Michael P. Lacy, "Litter Quality and Broiler Performance," The University of Georgia Cooperative Extension Service.
Robert J. Braddock, Handbook of Citrus By–Products and Processing Technology, Univerty of Florida, 1999 by John Wiley & Sons.
Puddy Good Products, website www.puddygoods.com.
R.H. Harms, et al., "Citrus PUlp for Poultry Litter and its Subsequet Feeding Value for Ruminants", Bulletin 734 (Technical), Apr. 1968.

(Continued)

*Primary Examiner*—Harvey E. Behrend
*Assistant Examiner*—Kimberly S. Smith
(74) *Attorney, Agent, or Firm*—Raymond M. Mehler; E. J. Asbury, III (57) ABSTRACT

An improved poultry bedding litter composition is used which includes byproduct or waste material from citrus juice extraction. The citrus peel byproduct or waste preferably is in a dried and flaked state. Such bedding litter compositions improve poultry characteristics and enhance feed conversion when compared with traditional poultry bedding litters such as wood shavings.

25 Claims, 2 Drawing Sheets

U.S. PATENT DOCUMENTS

| | | | |
|---|---|---|---|
| 5,320,066 A | | 6/1994 | Gunter |
| 5,448,967 A | | 9/1995 | Ryan |
| 5,510,310 A | | 4/1996 | Manning |
| 5,526,770 A | * | 6/1996 | Kiebke ...................... 119/171 |
| 5,622,697 A | | 4/1997 | Moore, Jr. |
| 5,753,593 A | | 5/1998 | Pullen et al. |
| 5,900,253 A | | 5/1999 | Ito |
| 5,914,104 A | | 6/1999 | Moore, Jr. |
| 5,945,333 A | | 8/1999 | Rehberger |
| 5,951,946 A | | 9/1999 | Eaton et al. |
| 5,960,743 A | * | 10/1999 | Taylor ...................... 119/173 |
| 5,961,968 A | | 10/1999 | Moore, Jr. |
| 5,964,187 A | | 10/1999 | Willis |
| 5,970,916 A | | 10/1999 | Yoder et al. |
| 5,985,923 A | | 11/1999 | Rossi |
| 6,017,525 A | | 1/2000 | Logan et al. |
| 6,039,004 A | | 3/2000 | Goss et al. |
| 6,277,389 B1 | | 8/2001 | Pullen |
| 6,523,496 B1 | | 2/2003 | Keithly et al. |

OTHER PUBLICATIONS

Sorbara, J.O.B. et al., "Evaluation of Citrus Pulp Pellets as Broiler Litter", Department of Animal Husbandry, Paulista State University, School of Agrarian and Veterinarian Sciences (circa. 1999.).

Reece, F.N., et al., "Ammonia in the Atmosphere During Brooding Affects Performance of Broiler Chickens," (Received for Publication Apr. 11, 1979).

Ross Breeder, "Broiler Management Guide" (undated).

Khan, et al., "Efficacy of Tetrachlorvinphos Insecticide Dust Against Darkling Beetles in Commercial Broiler Chicken Barns", Alberta Agriculture, Food and Rural Development, Sep. 12, 1998.

Safrit and Axtell, "Evaluations of Sampling Methods for Darkling Beetles (*Alphitobius diaperinus*) in the Litter of Turkey and Broiler Houses", North Carolina State University, Feb. 25, 1984.

Brake, et al., "Evaluations of Whole Chopped Kenaf and Kenaf Core Used as a Broiler Litter Material" Department of Agricultural of Agricultural Economics, and College of Veterinary Medicine, 1993 Poultry Science 72:2079–2083.

Ivos, et al., "A Contribution to the Hygiene of Deep Litter in the Chicken House", School of Veterinary Medicine, University of Zagreb, Jul. 5, 1965.

Alford and Murray, "Prospects for citrus Limonoids in Insect Pest Management", University of Maine, 2000 American Chemical Society.

Benabdeljelil and Ayachi, "Evaluation of Alternative Litter Materials for Poultry", Institute of Agronomy and Veterinary Medicine, 1996 J. Appl. Poultry Res.5:203–209.

Minks, et al., "Entomologia", Nederlandse Entomologische Vereniging, vol. 32, 1983.

PCT International Search Report, PCT/US02/20586, Jun. 3, 2003.

PCT International Search Report, PCT/US02/20590, Oct. 2, 2003.

* cited by examiner

ENHANCING COMMERCIAL POULTRY OPERATIONS WITH LITTER HAVING CITRUS BYPRODUCT

REFERENCE TO RELATED FILINGS

This is a divisional of application Ser. No. 10/341,729, filed Jan. 14, 2003, now U.S. Pat. No. 6,708,647 which is a divisional of application Ser. No. 09/898,997, filed Jul. 3, 2001, now U.S. Pat. No. 6,523,496.

BACKGROUND OF THE INVENTION

1. Field of Invention

The present invention relates to litter or bedding for commercial poultry raising facilities, along with a process for improving and enhancing the commercial viability of these types of facilities. The invention also provides a valuable and economically attractive use of dried citrus peel byproduct or waste, including components thereof, for use as the litter or bedding in commercial poultry raising operations. Citrus byproduct can be used alone or in combination with traditional bedding components. The citrus byproduct improves the performance of the litter or bedding and significantly reduces the occurrence of poultry imperfections and enhances bird health and feed efficiency.

2. Description of Related Art

Current commercial-scale poultry raising operations house the poultry in confined spaces. Floors of those spaces traditionally are covered with bedding litter material. Feed and water is made available to the chicks so they can mature into adult birds which typically are intended as a food source. Generally, these are high volume facilities, and efficiency and cost control are extremely important. While the majority of these operations are for chicken production, other poultry can be included, such as turkey, ducks, geese and less common poultry as well.

In a typical commercial operation of this type, the poultry remains on the litter or bedding for the duration of its stay within the confined location. Under these circumstances, excretion and feces from the birds collect on the litter bed throughout the birds' stay within the confined space. While the birds remain under these conditions, the volume of bird droppings increases throughout this confinement period. Under these conditions, conventional bedding litter materials tend to deteriorate, and their effectiveness in functioning to reduce contact between the birds and their droppings is severely tested. Many litter materials fail in their intended function, especially as the time during which the birds live on the litter increases. Furthermore, most litter materials do not provide any substantial active components to counteract the negative effects of the bird excrement.

Poor litter performance is undesirable. It can allow for contact between the birds and deleterious droppings components and/or resultant products such as ammonia. Used litter also becomes seeded with pathogens and fungi. Parasites, for example, can be found in poultry pen litter. Moist conditions typically contribute significantly to forming or providing a breeding ground for these types of negative litter quality factors, as noted in Lacy, "Litter Quality and Broiler Performance," The University of Georgia Cooperative Extension Service, Athens, Ga., 1991, incorporated by reference hereinto. In some commercial poultry operations, litter is reused for multiple growing cycles, creating even greater challenges for the bedding litter.

Rehberger U.S. Pat. No. 5,945,333, incorporated by reference hereinto, recognizes these types of problems and their manifestation as foot pad lesions, breast blisters, and air sac infections, for example. This prior art patent proposes a biological solution to these litter problems by treating poultry litter with a composition for producing a certain blend of bacteria. This proposed type of treatment adds cost, can be perceived as a non-organic approach, and does not address the inherent deficiencies of conventional litter material itself.

Typically preferred litter material for poultry houses is a cellulosic litter from woody sources such as pine wood shavings and saw dust. As noted in the Lacy article, other proposed litter materials include various other cellulosic and woody materials, each having disadvantages as noted in that article. Included in this suggested litter material are hardwood shavings and sawdust, pine or hardwood chips, processed paper, rice hulls, peanut hulls, sugarcane pomace (bagasse), crushed corn cobs, and chopped straw, hay or corn stover.

While poultry house litter or bedding has long been recognized as falling far short of solving many problems associated with raising poultry under economically efficient but confining conditions which are typically characteristic of commercial poultry raising operations, a satisfactory and very economical solution still is needed.

Previously proposed approaches include adding expensive active agents to conventional bedding materials. While these may be useful in treating particular problems such as pathogens, they do so with added cost and require added worker time and/or they often do not address the larger overall issue of bed deterioration. Active agent addition typically is required when the same litter material is used for multiple growing cycles, usually being incorporated during turning or fluffing of the previously used litter right in the pen. At times, non-organic agents are proposed for these purposes and for either fresh or recycled litter.

A particularly desirable solution would be to be able to use an inexpensive natural source for litter or bedding components or as a litter material itself in order to address these types of long-standing problems. Effective materials which do not require processing to be suitable for use in fresh or recycled bedding litter are recognized herein as being of value in this regard.

SUMMARY OF THE INVENTION

The present invention addresses these problems by providing litter or litter components which are inexpensive, widely available and advantageous as litter material. The invention provides a bedding litter for poultry raising houses which has as the litter material itself, either alone or combined with other litter materials, citrus byproduct which is dried citrus peel from citrus operations or components from dried citrus peel or pulp byproduct or waste from citrus juice extraction. The invention also entails a process for enhancing commercial poultry raising operations, which includes placing dried citrus peel byproduct material onto the floor area of a space within which poultry chicks are raised until they achieve a size suitable for commercial meat supplies, while reducing poultry imperfections and adjusted feed conversion.

An object of the present invention is to provide an improved bedding litter for commercial poultry operations or to improve existing bedding litter for these types of uses.

Another object of the present invention is to provide an improved poultry litter and poultry raising process through the use of a natural organic source of bedding litter which controls ammonia development and reduces the frequency of the development of imperfections in poultry during the course of their contact with the litter.

Another object of this invention is to provide an improved poultry litter composition and poultry raising enhancement process by which a change in the composition of the poultry litter itself addresses substantial problems in poultry raising.

Another object of the present invention is to provide an economically beneficial and productive outlet for large quantities of solid byproduct from commercial citrus juice expressing operations.

A further object of this invention is to provide a product and process which enhances the effectiveness of poultry feed in translating into bird weight.

Another object of the present invention is to provide a product and process in the poultry litter business where litter components remain as in tact particles that are not substantially degraded, do not turn to compost, and do not cake together in the manner experienced by conventionally used current bedding litters.

Another object of embodiments of this invention is to provide improved product and process advances which use effective and inexpensive litter material in its "native" state without requiring extraction, isolation or purification.

A further object of the present invention is to provide a poultry bedding litter which, after use as a litter, provides a natural or organic source of animal food or fertilizer with acceptable nutrients and of a more positive environmental character.

These and other objects and advantages of the present invention will be understood from the following description according to preferred embodiments of the present invention, relevant information concerning which is shown in the accompanying drawings.

DESCRIPTION OF THE PREFERRED EMBODIMENTS

In commercial-scale poultry raising or growing operations, the poultry often are restricted to confined spaces for reasons which are well appreciated and are of economic value. Typically, the areas on which the growing poultry stand or rest are generally horizontal and can be considered to be floor surfaces. A material having a degree of absorption properties is spread onto these floor surfaces. That material is referred to as a litter, a bedding, or a bedding litter, these terms being used generally interchangeably herein. In a typical operation, each confined space can take the form of a house or pen within which the birds are confined for all bodily functions, including feeding and waste elimination. Feeding typically is carried out with feeders or containers of feed accessible to the birds and drinker mechanisms, some of which are designed to limit spillage.

Each confined area is intended to be used for raising multiple groups of poultry chicks throughout each year. In effect, one group of chicks is cycled through the confined area until a target is achieved. Typically, the target is a selected number of days of feeding. Other possible approaches can be tied to weight, size or other indication of when a bird achieves the desired level of maturity.

Once the selected benchmark has been reached, the adult birds are processed in a manner known in the art. This includes noting weight gain parameters. Also included are objective inspection of the birds for certain imperfections, and grading of the poultry, typically according to government-imposed standards or criteria.

Imperfections which are monitored include so-called foot pad lesions. This includes inspecting the pad of each foot of each bird and recording a foot pad score. In a typical inspection, a score of "3" indicates that an open sore lesion was detected on the pad. A score of "2" indicates that a healing sore is present, as indicated by scab formation. A score of "1" indicates pad burn (dermis), while a score of "0" indicates both foot pads are normal. In many situations, a score of "0" or "1" indicates poultry which is suitable for sale.

Breast blisters can develop, especially at the locations at which the lower portions of the bird breast typically will contact the soiled litter. In a typical inspection for breast blisters, a breast blister score of "2" indicates a large blister of greater than ¼ inch. A score of "1" indicates a smaller breast blister of not larger than ¼ inch. A breast blister score of "0" indicates that no breast blisters were detected on the bird.

The United States Department of Agriculture provides standards for poultry grading. These are generally available and known in the art. They comprise typical carcass grades of Grade A, Grade B and Grade C. For most applications for human consumption, Grade A is required. In addition, the lower grades have lesser economic value than those of the Grade A variety.

It is suggested that the state of the bedding litter can substantially affect conditions such as foot pad lesions, breast blisters, and the USDA Grade. It has been observed that the degree of negative impact on these indicators of bird quality relates to the level of ammonia in bedding litter during the course of its use. When ammonia levels increase unchecked, ammonia toxicity levels can be reached. Ammonia toxicity in commercial poultry operations has been linked to poultry blindness and dermatitis and to rejection of mature birds delivered to processors.

Bedding litter also can provide a breeding ground for insects and deleterious microorganisms. Bacterial populations are reduced with improved bedding litter performance. Poor bedding litter performance can be manifested in deteriorating overall bird health. Besides the readily apparent negatives of raising birds which have health problems, such as mortality, it is recognized here that a more healthy environment enhances the efficiency with which poultry feed is converted to poultry weight.

Unsuitable bedding litter can lead to deterioration of litter in many ways. Deteriorated litter can lead to poultry air sack damage. Bacterial infections and lung collapse can result from poor litter.

Bedding litter compositions of this invention have the ability to absorb moisture so as to reduce ammonia development. The bedding litter compositions also include advantageous components which have biological activity believed to be positive for poultry within the environment of the bedding litter composition. This activity can negate many of the bedding deterioration effects noted herein. Examples of bedding litter components in this regard include one or more of the following components and indicated biological activity or activities which are presently believed to contribute positively to poultry housed within an environment having a litter containing such component(s). Each component typically is found in dried citrus peel or pulp byproduct or waste from citrus fruit extraction facilities.

Pectin and demethylated pectin are believed to effectively trap ammonia, resulting in a reduction of gaseous ammonia. These are useful components of bedding litter compositions. Used litter having the trapped ammonia provides a natural nitrogen source for fertilizers, for example.

Cellulose, hemicellulose and starch are components contributing moisture absorption and release functions in soiled bedding. Their inclusion provides benefits of this type.

Food grade acids such as citric acid and malic acid are acidifiers for enhancing general bird health. Such acids are found in citrus byproduct or waste from citrus extraction facilities.

Antioxidants can positively impact bird health, including ascorbic acid, carotenoids, beta-carotene, beta-cryptoxamthin, lycopene, and xanthophylls. Citrus byproducts provide some or all of these.

Antimicrobial activity, antiviral activity, and general bird health are positively addressed by litter composition components from citrus byproducts which are flavonoids including naringin, naringenin, narirutin, hesperidin and hespertin as well as polymethoxylated flavones including sinensetin, tangeretin and nobiletin.

Tocopherols as litter components promote general bird health and are believed to be of assistance in controlling odor of soiled litter. These are available from citrus peel byproduct material.

Antimicrobial and/or insect antifeedant activities or insecticidal activities are believed to be provided by litter components including limonin, nomolin, limonin glucosides, and d-limonene. Each is provided by citrus byproduct.

A readily available and relatively inexpensive source of many to all of these components is dried citrus product which can be citrus peel or pulp byproduct or waste which is dried in accordance with generally known industry practices. This is dried citrus byproduct. It is a preferred ingredient for the subject bedding litter compositions. Dried citrus byproduct incorporates one, some, many or all of the components noted above and elsewhere herein. For economic and positive environmental and organic reasons, the components can be used as is and without requiring extraction, purification or isolation. They can be provided in their native state and in the valuable combinations already present in dried citrus peel and pulp.

In addition to incorporating such beneficial components in a very readily available and inexpensive source, such dried citrus peel sources have organic qualities and break down organically after removal from poultry houses as a component of used litter. When dried citrus peel is incorporated in the bedding litter composition, the used composition provides organic fertilizer which is environmentally responsible for spreading on agricultural fields, having no added chemicals such as biocides or antibiotics. This does have agriculturally important sources of nitrogen and other plant nutrients. This used litter composition also provides an environmentally responsible feed stock, such as for ruminants.

Ammonia present in poultry pens is trapped by the bedding components, typically by way of chemical bonding. A good source of organic nitrogen for fertilizer or feed thus is provided. Concerning phosphorus present in the bedding, there is a substantially reduced amount of soluble phosphorous. This lessens potential environmental run-off issues, whether the used litter is later used in feed or fertilizer.

While one or more of these natural components can be for use in a poultry litter composition, a very economical source of these is the dried citrus peel or dried citrus pulp which is a voluminous byproduct of citrus juice extraction operations. This citrus waste material is typically dried as citrus waste material that is widely varying or heterogeneous in terms of components, particle sizes and even shapes. Typical dried citrus waste material is composed of primarily large particles having a general length or width or size of about ½ inch or greater, while also including a relatively low volume of fine particles.

As used herein, this heterogeneously sized dried citrus waste material is referred to as being flaked. This flaked dried citrus byproduct can include fine particles on the order of 1% by weight, usually less than 10% by weight, with at least 10% by weight of irregularly shaped particles in excess of ¾ inch in size. Typical moisture contents of this flaked dried citrus byproduct range between about 5 and about 12 weight percent moisture, based upon the total weight of the byproduct, typically between about 7 and 11 weight percent. Where greater moisture reduction cost is acceptable, a moisture content of between about 8 and 9 weight percent can be practiced.

There is no need to resize or uniformly shape the flaked dried citrus byproduct. It can be used as the product of traditional citrus residue processing into so-called dried pulp. This typically includes a so-called liming process in which the raw, wet citrus residue is treated with calcium oxide ("quicklime"), pressed and dried into loose dried pulp. This can serve as the dried citrus byproduct as used herein. Details on the production of this loose dried pulp can be found in Braddock, *Handbook of Citrus By-Product and Processing Technology*, Chapter 10, "Dried Pulp, Pellets and Molasses," pages 135–148, incorporated by reference hereinto.

It is believed that this liming demethylates or de-esterifies pectin present in the loose dried pulp at about 30 weight percent of the dry matter. This demethylated pectin is favorable to trapping ammonia in the present bedding litter.

Citrus waste can also be reshaped into pelletized form. At times, this additional processing is carried out to facilitate handling. Often, dried citrus waste is in this form for a traditional use of same as feed for ruminants. Dried citrus waste, peel and/or pulp can be provided in this pelletized form. Generally, because a poultry litter is to be an inexpensive item, additional processing such as pelletizing could negatively impact upon the economic balance of a poultry raising operation.

This dried citrus byproduct, whether individual components or as a naturally occurring combination or complex mixture of the litter components, can be combined with other traditional bedding litter materials. In the present bedding litter compositions, these are secondary litter materials, including shaved pine, wood chips, sugarcane bagasse, and the like. Often these secondary bedding litter materials will be much more homogeneous in particle size when compared with most sources of dried citrus waste material or the citrus byproduct hereof. Other secondary litter materials include wood or woody plant originating materials such as soft wood shavings and sawdust, hardwood shavings and sawdust, softwood chips, hardwood chips and processed paper. Vegetation sources include rice hulls, peanut hulls, crushed corn cobs, chopped straw, hay or corn stover. These can be used in combination.

Generally, the dried citrus byproduct (whole composition or components thereof) comprise from about 10 to about 100 volume percent of the bedding litter composition. The secondary litter sources, when included, will comprise between about 0 and about 90 volume percent of the bedding litter composition. Other such compositions can have at least about 20 volume percent dried citrus byproduct and up to about 80 volume percent secondary litter sources.

Certain enhancements of the present poultry bedding litter over traditional cellulosic poultry bedding litter are illustrated by the following.

EXAMPLE 1

A study was conducted to evaluate bedding litters within pens of the type typically used in poultry raising facilities. The testing was carried out over a typical growing period for broiler chickens, while monitoring certain parameters of importance to the poultry industry. The testing protocol strove to maintain all environmental, feeding and other conditions consistent for all birds, with the exception of the bedding litter composition.

Study Protocol

In accordance with typical industry practices, the diets for each pen were as follows. For days 0 through 19, the birds were given a 22% starter diet in crumbled form, the balance of the feed being typical basal feed material. 4,000 pounds of feed containing a coccidiostat feed additive (salinomycin at 50 grams per ton) were prepared for early feeding. During days 19 through 35, a grower diet containing 20% pelleted grower feed formulation was combined with the basal feed containing the same feed additives and feed additive concentrations as in the starter diet. 8,500 pounds of this grower diet were prepared. A finisher diet was fed from day 35 to day 49, the final day of the study. 12,000 pounds of this feed was formulated to include 18% finisher diet in pelleted form, balance being basal feed, no feed additives being used at this finisher stage.

The species involved in the testing was broiler chicken of commercial production strain and Cobb×Cobb breed, the supplier being Cobb-Vantress, Inc. of Cleveland, Ga. The birds were supplied as male and 1 day of age upon receipt (day 0 in the study). Pen cards were used for identification. The total number of pens used in the study was 39, with approximately 52 birds being in each pen at the initiation of the study. At day 7, each pen was targeted to have 50 birds, three different bedding litter compositions were used, and each composition was experienced by a target of 650 birds, there being 13 pens for each litter composition.

The compositions were assigned to individual pens using a complete randomized block design, with the composition assigned to each pen being by way of a computer-generated assignment period. Clean concrete floor pens within an environmentally controlled facility were used. All birds were placed on an initially clean litter, and lighting followed a typical commercial program. Within the pens, the floor space was approximately 0.8 square feet per bird. These housing conditions simulated conditions in commercial poultry raising facilities. Plywood barriers were placed between each pen in order to prevent bird migration and minimize litter transfer across pens.

The bedding litter compositions were as follows. Composition 1 was the control, namely 100% pine wood shavings, a typical litter used in commercial poultry raising facilities. Composition 2 was 100% dried citrus byproduct as received from a commercial orange juice extraction byproduct or waste flow treated to dried pulp generally in accordance with Chapter 10 of Braddock, *Handbook of Citrus By-Products and Processing Technology*. Composition 3 was a 50:50 (volume %/volume %) blend of Composition 1 and Composition 2.

The birds were vaccinated for Mareks at the hatchery, and they were vaccinated for Newcastle and Infectious Bronchitis (NCB) at approximately 7 days of age by addition to the drinking water. Water was provided ad libitum throughout the study by way of a single automatic 14-inch diameter bell drinker within each pen. For approximately the first 5 days of age, a floor-placed gallon drinker also was placed in each pen to facilitate access by the small chicks. A clean and constant water supply was provided to the birds.

The feed was provided ad libitum throughout the study by way of two 17 inch diameter hanging tube feeders within each pen. A chick feeder tray also was placed in each pen for approximately the first 5 days. All feed added and removed from the pens was weighed and recorded.

Litter samples were collected from each pen within the time frame of the end of the study for analysis purposes. Samples were collected from six locations in each pen (approximately 40 grams each), two samples being from the front of the pen, to samples being from the back of the pen, one sample being from between the bell drinker and the front feeder, and one sample being collected from between the bell drinker and the back feeder. All six samples from each pen were combined and mixed well. An approximately 100 gram sample from each was segregated to test for total coliform counts. The remaining samples from each pen containing the same litter composition were combined and mixed. This composite sample for each composition was collected for analysis of total nitrogen (Kjeldahl method) and nutrient composition (crude protein, crude fiber, crude fat and calcium).

The test facility, pens and birds were observed at least twice daily for general flock condition, lighting, water, feed, ventilation, daily maximum and minimum temperatures, and any unanticipated events. These observations included noting any apparent bedding litter consumption by the birds, non being observed.

Mortalities or removals occurred occasionally, such being removed from the pen and necropised to determine probable cause of death. Birds were weighed on a pen basis on approximately day 16 and day 49 periods. On about day 18, foot pads of the birds were spot-checked for any lesions at each body weight measurement, and performance data were summarized by average weight per bird on a pen basis. The average feed conversion was calculated using the total feed consumption in a pen (for that period) divided by the total weight of surviving birds. Adjusted feed conversion was calculated using the total feed consumption in a pen divided by the total weight of surviving birds and the weight of birds that died or were removed from that pen.

Carcass Quality Results

The quality of each carcass was determined in accordance with the following. The USDA Grade of each carcass was recorded as A, B or C. A foot pad score for each individual was determined as follows: An individual having no burn, scab or lesion on its foot pad was scored as normal ("0"). A dermis only foot pad burn was recorded as a "1" reading. An individual having a pad scab (indicating healing) on one or both feet was given a "2" score. An individual having a pad lesion (open sore) on one or both feet was given a "3" score. When no breast blisters were present on an individual, a score of "0" was given. A small (equal to or less than ¼ inch) breast blister was given a score of "1", and a larger (greater than ¼ inch) breast blister was given a score of "2".

At the end of the study, abdominal fat pads were collected from one randomly selected bird (first bird within reach) from each pen. Fat pads from birds within pens having the same litter composition were combined and sampled for pesticide analysis. No differences were noted among Compositions 1, 2 and 3.

A summary of the day 50 foot pad scores, carcass grades and breast blister scores are provided in Table I.

1. It was 69.8% for Composition 2 and 59.1% for Composition 3.

Figure 3:
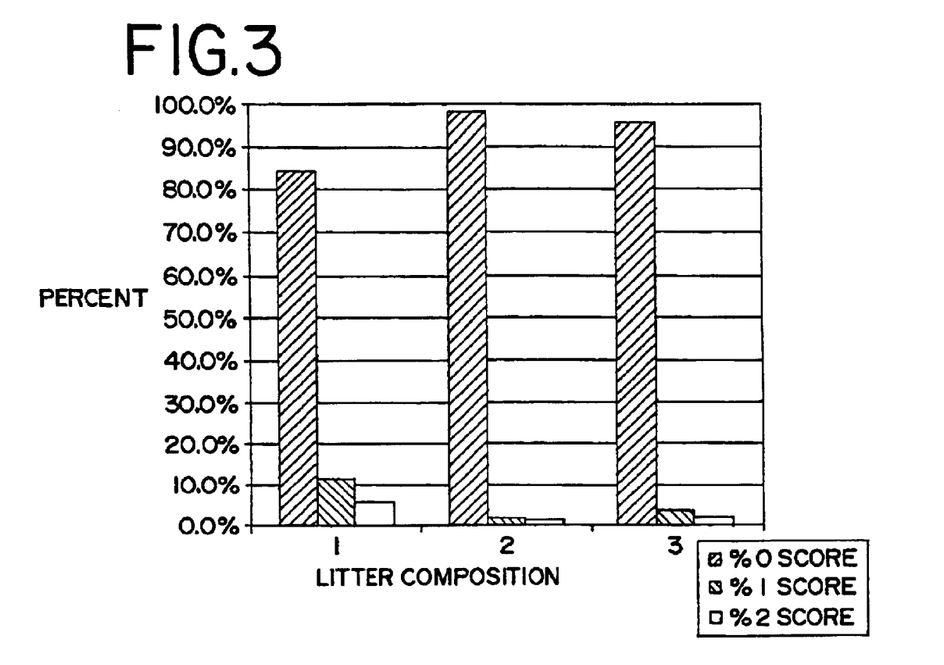
FIG. 3 is a bar graph plot of breast blister scores from the poultry litter efficacy study.

The breast blister score data reported in Table I are set out in bar graph form in FIG. 3. 15.4% of the birds on control litter Composition 1 had breast blisters, whereas only 1.7% of those on Composition 2 and 3.9% on those of Composition 3 had evidence of breast blisters. The average score for Composition 1 was 0.20, while that for compositions 2 and 3 were 0.02 and 0.05 respectively.

Concerning the carcass grade scores, a Grade A indicates a "0" score, and Grade B indicates a "1" score, and a Grade C indicates a "2" score. Composition 1 had a carcass grade

TABLE I

| Litter | No. of Birds Scored | Number of Birds Per Pen With - | | | | | | | | | |
|---|---|---|---|---|---|---|---|---|---|---|---|
| | | Foot Pad Score of: | | | | Carcass Grade of: | | | Breast Blister Score of: | | |
| | | 0 | 1 | 2 | 3 | A | B | C | 0 | 1 | 2 |
| 1 | 45 | 1 | 5 | 21 | 18 | 37 | 5 | 3 | 27 | 14 | 4 |
| Control | 47 | 3 | 11 | 18 | 15 | 42 | 5 | 0 | 42 | 4 | 1 |
| 100% | 47 | 1 | 1 | 10 | 35 | 40 | 7 | 0 | 40 | 6 | 1 |
| Pine | 46 | 3 | 3 | 15 | 25 | 41 | 5 | 0 | 41 | 1 | 4 |
| wood | 43 | 2 | 12 | 19 | 10 | 42 | 0 | 1 | 43 | 0 | 0 |
| Total | 228 | 10 | 32 | 83 | 103 | 202 | 22 | 4 | 193 | 25 | 10 |
| Percent | | 4.4% | 14.0% | 36.4% | 45.2% | 88.6% | 9.6% | 1.8% | 84.6% | 11.0% | 4.4% |
| 2 | 47 | 14 | 20 | 12 | 1 | 43 | 3 | 1 | 44 | 2 | 1 |
| 100% | 46 | 21 | 11 | 13 | 1 | 46 | 0 | 0 | 46 | 0 | 0 |
| citrus | 45 | 23 | 8 | 10 | 4 | 44 | 1 | 0 | 44 | 1 | 0 |
| peel | 43 | 17 | 12 | 7 | 7 | 42 | 1 | 0 | 43 | 0 | 0 |
| | 44 | 21 | 10 | 11 | 2 | 43 | 0 | 1 | 44 | 0 | 0 |
| Total | 225 | 96 | 61 | 53 | 15 | 218 | 5 | 2 | 221 | 3 | 1 |
| Percent | | 42.7% | 27.1% | 23.6% | 6.7% | 96.9% | 2.2% | 0.9% | 98.2% | 1.3% | 0.4% |
| 3 | 47 | 10 | 12 | 22 | 3 | 43 | 3 | 1 | 40 | 5 | 2 |
| 50:50 | 48 | 21 | 13 | 14 | 0 | 47 | 1 | 0 | 47 | 1 | 0 |
| Pine | 44 | 23 | 14 | 7 | 0 | 44 | 0 | 0 | 44 | 0 | 0 |
| Wood/ | 46 | 18 | 5 | 18 | 5 | 44 | 2 | 0 | 45 | 1 | 0 |
| Citrus peel | 47 | 14 | 7 | 14 | 12 | 45 | 2 | 0 | 47 | 0 | 0 |
| Total | 232 | 86 | 51 | 75 | 20 | 223 | 8 | 1 | 223 | 7 | 2 |
| Percent | | 37.1% | 22.0% | 32.3% | 8.6% | 96.1% | 3.4% | 0.4% | 96.1% | 3.0% | 0.9% |

Figure 1:
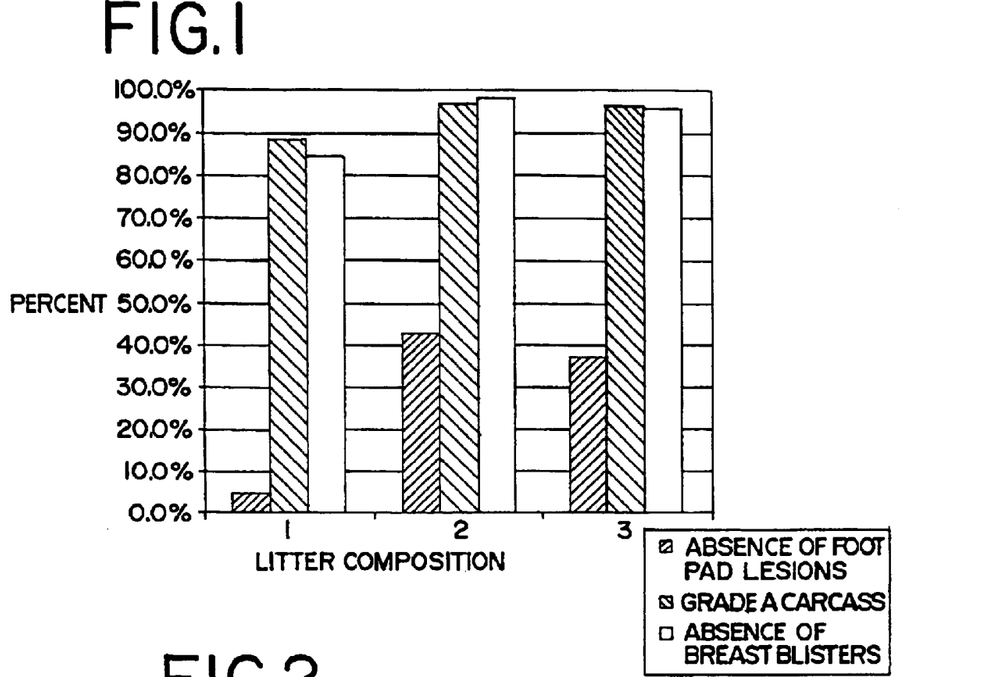
FIG. 1 is a bar graph plot of test results from an efficacy study of different litter materials on broiler performance, illustrating the percent of birds with carcass Grade A rating and the percent of birds without foot pad lesions or without breast blisters.

From these data it is noted that 96.9% of the birds on litter Composition 2 were Grade A, and 96.1% of the birds on Composition 3 were Grade A. Only 88.6% of the birds on control Composition 1 were Grade A. While only 4.4% of the birds on control Composition 1 were without foot pad lesions, 42.7% of the birds on Composition 2 and 37.1% of the birds on Composition 3 were without foot pad lesions. 84.6% of the birds on Composition 1 were without breast blisters, while 98.2% of the birds on Composition 2 and 96.1% of the birds on Composition 3 were without breast blisters. These data are presented in bar graph form in FIG. 1.

Figure 2:
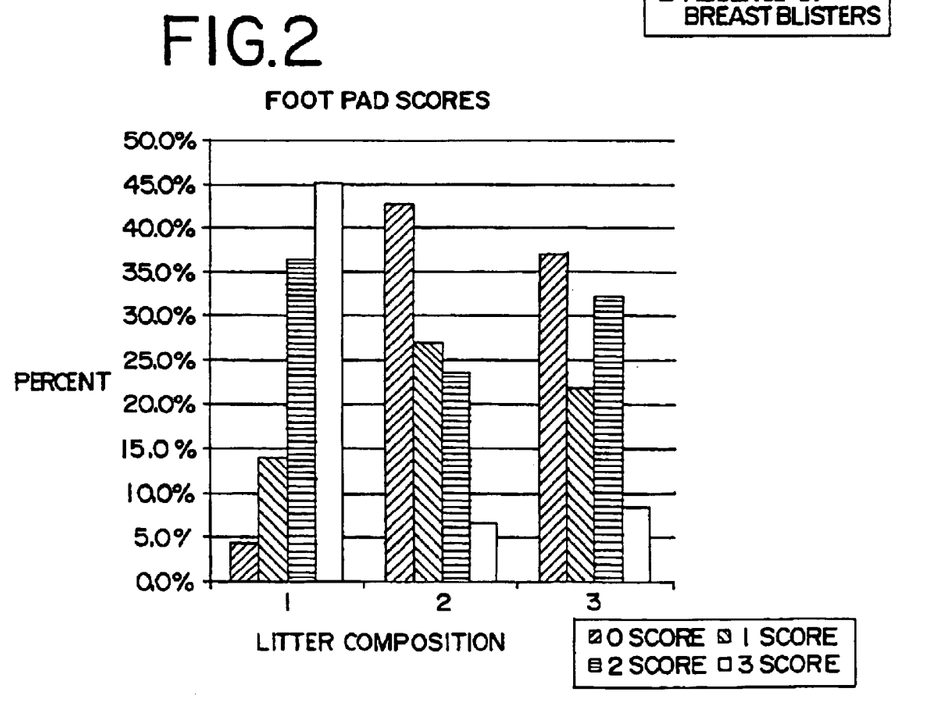
FIG. 2 is a bar graph plot of data of foot pad scores from a poultry litter efficacy study.

With reference to the foot pad lesion scores of Table I, it will be noted that a strong majority of the birds on litter Composition 1 had a foot pad score of 2 or 3. The average foot pad score of all of the birds on control Composition 1 was 2.20. By contrast, the average foot pad score for birds on Composition 2 was 0.93 and for Composition 3 was 1.14. The percentages of these foot pad scores are set out in bar graph form in FIG. 2. Furthermore, the total percentage of good scores of "0" or "1" was only 18.4% for Composition score of 0.13, while each of compositions 2 and 3 had a carcass grade score of 0.04.

Observations noted that Composition 1 had a noticeable "chicken barn" odor, while Compositions 2 and 3 has an odor neutralizing effect indicated by the lack of such odor at the end of the test period. By the end of the study, all pens' litter was slick and caked over, indicating that the wetting effect of the bell drinkers provided excess water on the litter and a substantial opportunity for ammonia development. Mortality levels all were within the acceptable range. Composition 1 had deteriorated to a compost state, while compositions 2 and 3 still had intact dried citrus byproduct which was still of its original shape and size for the most part.

Feed Conversion Results

Performance data for birds at 16 days of age are reported in Table II.

TABLE II

| Litter | Started | Number of birds Mortality | Removed | Weighed | Bird Ave. Wt. (kg) | Feed Conversion | Adjusted Feed Conversion |
|---|---|---|---|---|---|---|---|
| Control 100% Pine Wood | 50 | 1 | 0 | 49 | 0.451 | 1.262 | 1.242 |
| | 50 | 1 | 0 | 49 | 0.459 | 1.276 | 1.244 |
| | 50 | 0 | 0 | 50 | 0.506 | 1.229 | 1.216 |
| | 50 | 0 | 0 | 50 | 0.458 | 1.271 | 1.256 |
| | 50 | 1 | 0 | 49 | 0.469 | 1.226 | 1.206 |
| | 50 | 0 | 0 | 50 | 0.464 | 1.237 | 1.228 |
| | 50 | 0 | 0 | 50 | 0.496 | 1.210 | 1.201 |
| | 50 | 0 | 0 | 50 | 0.480 | 1.221 | 1.213 |
| | 50 | 0 | 0 | 50 | 0.490 | 1.204 | 1.194 |
| | 50 | 1 | 0 | 49 | 0.492 | 1.249 | 1.230 |
| | 50 | 1 | 0 | 49 | 0.482 | 1.271 | 1.247 |
| | 50 | 3 | 0 | 47 | 0.494 | 1.237 | 1.184 |
| | 50 | 0 | 0 | 50 | 0.482 | 1.237 | 1.223 |
| Total & Average | 650 | 8 | 0 | 642 | 0.479 | 1.241 | 1.222 |
| 100% Citrus Peel | 50 | 0 | 0 | 50 | 0.440 | 1.245 | 1.231 |
| | 50 | 0 | 0 | 50 | 0.442 | 1.258 | 1.250 |
| | 50 | 0 | 0 | 50 | 0.474 | 1.228 | 1.218 |
| | 50 | 1 | 0 | 49 | 0.486 | 1.223 | 1.200 |
| | 50 | 1 | 0 | 49 | 0.465 | 1.215 | 1.186 |
| | 50 | 0 | 0 | 50 | 0.444 | 1.257 | 1.243 |
| | 50 | 0 | 0 | 50 | 0.456 | 1.250 | 1.241 |
| | 50 | 0 | 0 | 50 | 0.504 | 1.167 | 1.154 |
| | 50 | 1 | 1 | 48 | 0.494 | 1.211 | 1.190 |
| | 50 | 0 | 0 | 50 | 0.508 | 1.173 | 1.161 |
| | 50 | 0 | 0 | 50 | 0.482 | 1.216 | 1.204 |
| | 50 | 1 | 0 | 49 | 0.486 | 1.210 | 1.190 |
| | 50 | 1 | 0 | 49 | 0.476 | 1.215 | 1.197 |
| Total & Average | 650 | 5 | 1 | 644 | 0.474 | 1.221 | 1.205 |
| 50:50 Pine Wood/ Citrus Peel | 50 | 1 | 0 | 49 | 0.453 | 1.288 | 1.272 |
| | 50 | 1 | 0 | 49 | 0.467 | 1.258 | 1.230 |
| | 50 | 0 | 0 | 50 | 0.486 | 1.243 | 1.234 |
| | 50 | 1 | 0 | 49 | 0.488 | 1.243 | 1.219 |
| | 50 | 0 | 0 | 50 | 0.480 | 1.221 | 1.213 |
| | 50 | 2 | 0 | 48 | 0.479 | 1.217 | 1.195 |
| | 50 | 0 | 0 | 50 | 0.496 | 1.194 | 1.185 |
| | 50 | 0 | 0 | 50 | 0.516 | 1.178 | 1.170 |
| | 50 | 1 | 0 | 49 | 0.473 | 1.198 | 1.180 |
| | 50 | 1 | 0 | 49 | 0.496 | 1.230 | 1.204 |
| | 50 | 0 | 0 | 50 | 0.514 | 1.191 | 1.181 |
| | 50 | 0 | 0 | 50 | 0.446 | 1.238 | 1.227 |
| | 50 | 0 | 0 | 50 | 0.502 | 1.215 | 1.202 |
| Total & Average | 650 | 7 | 0 | 643 | 0.484 | 1.224 | 1.209 |

Figure 4:
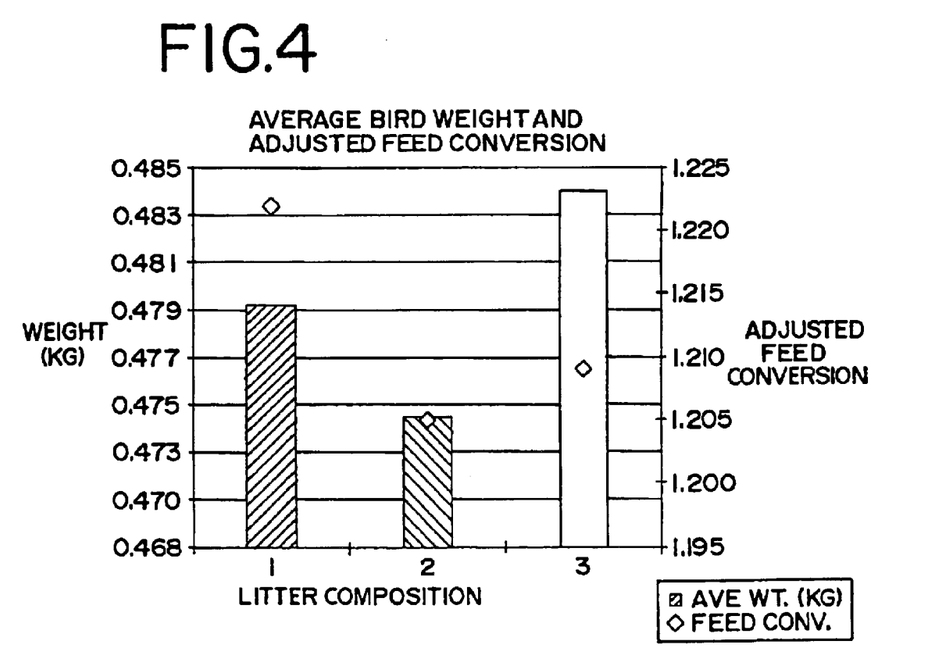
FIG. 4 is a plot of short-term average bird weight and adjusted feed conversion data from an initial period of the litter material efficacy study.

For control litter Composition 1, the average bird weight at day 16 was 0.479 kilograms. For litter Composition 2, the average bird weight at day 16 was 0.474 kilograms. For birds on litter composition 3, the average bird weight was 0.484 kilograms. When the total feed consumed by these birds was divided by this total bird weight for birds on each respective litter composition, the feed conversion was determined. An adjusted feed conversion is determined by including the weight of birds that died or were removed in order to take into consideration the actual amount of feed converted into bird weight. The resulting adjusted feed conversion at day 16 was 1.222 for the birds raised on control litter Composition 1, while those on either litter Composition 2 or 3 was considerably lower at day 16, 1.205 and 1.209, respectively. This illustrates that, with litter compositions 2 or 3, significantly less feed was required to attain bird weight of the birds raised on control litter Composition 1. These average weight and adjusted feed conversion values are set out in visual form in FIG. 4.

Ammonia Levels

At the end of the study of this Example, litter was removed from one pen of each composition, placed into plastic bags that were sealed, and then placed into 30-gallon containers or barrels without lids. These containers sat overnight at room temperature. Ammonia levels in each sealed bag were then measured using a Matheson toxic gas detector, Model 8014KA and Precision gas detector tubes #105SC (5–260 ppm). The ammonia levels of Composition 1 were in excess of 260 ppm (the maximum reading possible using these gas detector tubes). For Composition 2, the ammonia level was approximately 10 ppm, and for Composition 3, the ammonia level was approximately 20 ppm.

This testing was essentially repeated, except this time Precision gas detector tubes #105SB (50–900 ppm) were used. The barrels were closed and sealed and placed within an environment at about 90° F. Ammonia readings were taken from each barrel 24 hours and 48 hours later. For Composition 1, the average ammonia reading at 24 hours was 783 ppm, and at 48 hours 763 ppm. For Composition 2, the average ammonia reading was 27 ppm at both 24 hours and 48 hours. For Composition 3, the average ammonia reading at 24 hours was 176 ppm, while at 48 hours, the average ammonia reading was 177 ppm. Thus, compared to control Composition 1, litter Composition 2 reduced the ammonia levels by about 96%, and litter Composition 3 reduced the ammonia levels by about 77%.

Coliform Counts

Coliform counts were taken from the litter samples at the end of the study. The number of gram negative bacteria per gram of litter was recorded for each pen. The average numerical value for control Composition 1 was 2,279,231, or $2.3 \times 10^6$. For litter Composition 2, the average count number was 1,197,000, or $1.2 \times 10^6$. For litter Composition 3, the average count number was 972,592, or $9.7 \times 10^5$.

Nutrient and Nitrogen Analysis

At the end of the study of this Example, consolidated litter samples were subjected to nutrient and nitrogen analysis. These included moisture as received by the testing facility, moisture at assay, nitrogen in accordance with the Kjeldahl procedure, fat percent by acid hydrolysis, crude fiber, potassium, calcium, total phosphorus, and water soluble phosphorus, using Dionex IC water soluble phosphate, ortho-phosphate. The test results data are reported in Table III.

TABLE III

ANALYSES OF SOILED POULTRY LITTER

| Assay (Analyte) | Composition 1 | Composition 2 | Composition 3 | 2 vs. 1 |
|---|---|---|---|---|
| Moisture as Received | 40.6% | 33.6% | 35.7% | −17.2% |
| Total Nitrogen | 2.10% | 2.60% | 2.43% | +23.8% |
| Protein (N × 6.25) | 16.1% | 20.6% | 18.2% | +28.0% |
| Fat (acid hydolysis) | 2.43% | 3.06% | 2.99% | +25.9% |
| Crude Fiber | 11.42% | 11.0% | 10.4% | −3.7% |
| Potassium | 14,633 ppm | 13,833 ppm | 14,166 ppm | −5.5% |
| Calcium | 1.55% | 1.46% | 1.57% | −5.8% |
| Total Phosphorus | 1.093% | 0.826% | 0.919% | −24.4% |
| Water Soluble Phosphorus | 0.130% | 0.078% | 0.082% | −39.9% |

In Table III, the moisture as received was the percent of native moisture content of the soiled litter, and the protein was the percent protein plus bound ammonia. The following observations can be made.

Litter Composition 2 had a moisture reduction of 17.2% over control litter Composition 1. This indicates that the citrus byproduct Composition facilitated release of moisture within the pens, apparently due to evaporation within the poultry facility. Total nitrogen content of litter Composition 2 showed an increase of 23.8% over the control litter Composition 1. There was a 28% increase of Composition 2 over Composition 1 in calculated protein content. This indicates more effective ammonia trapping by the citrus byproduct litter, further indicating enhanced ammonia control within the pens. This also indicates enhanced value as a feedstock, such as for ruminants, and as fertilizer having a desirable nitrogen content.

The total phosphoreus content was 24.4% lower for litter Composition 2 when compared with control Composition 1, and the water soluble phosphorus was reduced 39.9% by Composition 2 when compared with the control. These data indicate that the citrus byproduct litter has environmental advantages. Reduced phosphorus levels, especially of the water soluble variety, indicate a reduced phosphorus pollution risk should the used litter be put in a position were run-off is an issue, such as when used litter could be used as feed or fertilizer.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A process for enhancing commercial poultry operations, comprising:
    supplying a space, the space having a floor area;
    placing bedding litter onto the floor area, the bedding litter including citrus byproduct from expressing citrus juice from citrus fruit, the byproduct including citrus peel flake component and being in a dried state, the bedding litter has between about 10 and about 100 volume percent of the citrus byproduct, and up to about 90 volume percent of a secondary bedding component other than said citrus byproduct;
    providing poultry in the space and onto the bedding litter, and feeding the poultry; and
    removing the poultry from the space and noting a quality characteristic of the poultry, the quality characteristic of said poultry being improved when compared with the same characteristic of poultry placed upon a pine wood shavings bedding litter which is about 100 volume percent pine wood shavings.

2. The process in accordance with claim 1, further including noting an adjusted feed conversion value for the poultry subjected to the process, said adjusted feed conversion value being less than that of poultry placed on the pine wood shavings bedding litter.

3. The process in accordance with claim 1, wherein the placing of bedding litter composition is preceded by collecting byproduct from commercial citrus juice extraction, the byproduct being selected from the group consisting of citrus peel, citrus pulp, citrus flavedo, citrus albedo, citrus rag, citrus seed, and combinations thereof, and drying the byproduct to provide a citrus byproduct flake component.

4. The process in accordance with claim 1, wherein the placing of bedding litter composition is preceded by collecting byproduct from commercial citrus juice extraction, treating the byproduct with a chemical to provide a limed byproduct, and drying the limed byproduct into a citrus byproduct flake component being particles having a non-uniform size and shape.

5. The process according to claim 4, further including placing the citrus byproduct flake component onto the floor area in the absence of an extraction being practiced upon the citrus byproduct flake component.

6. The process according to claim 1, further including formulating the bedding litter composition to have between about 20 and about 100 volume percent of the citrus byproduct, and up to about 80 volume percent of the secondary bedding component.

7. The process according to claim 1, wherein said removing and noting includes noting foot pad lesion scores as the quality characteristic of the poultry.

8. The process according to claim 1, wherein the placing of bedding litter places citrus byproduct flake component prepared by drying citrus byproduct from juice expressing equipment and without purifying the citrus byproduct present in the citrus byproduct flake component.

9. The process according to claim 1, wherein the placing of bedding litter places citrus byproduct flake component prepared by drying citrus byproduct from juice expressing equipment and without extracting the citrus byproduct present in the citrus byproduct flake component.

10. A process for enhancing commercial poultry operations, comprising:
    supplying a space for poultry, the space having a floor area;
    placing bedding litter onto the floor area, the bedding litter including citrus byproduct from expressing citrus juice from citrus fruit, the byproduct including citrus peel component, the bedding litter has between about 10 and about 100 volume percent of the citrus byproduct, and up to about 90 volume percent of a secondary bedding component other than said citrus byproduct;
    providing poultry in the space and onto the bedding litter, and feeding the poultry; and
    removing the poultry from the space and noting the adjusted feed conversion achieved by said poultry, said adjusted feed conversion showing greater efficiency than poultry placed upon a pine wood shavings bedding litter which is about 100 volume percent pine wood shavings.

11. The process in accordance with claim 10, wherein the placing of bedding litter places citrus byproduct flake component prepared by drying citrus byproduct from juice expressing equipment and without purifying the citrus byproduct present in the citrus byproduct flake component.

12. The process in accordance with claim 10, wherein the placing of bedding litter places citrus byproduct flake component prepared by drying citrus byproduct from juice expressing equipment and without extracting the citrus byproduct present in the citrus byproduct flake component.

13. The process in accordance with claim 10, wherein the placing of bedding litter composition is preceded by collecting byproduct from commercial citrus juice extraction, the byproduct being selected from the group consisting of citrus peel, citrus pulp, citrus flavedo, citrus albedo, citrus rag, citrus seed, and combinations thereof, and drying the byproduct to provide a citrus byproduct flake component.

14. The process according to claim 10, further including placing the citrus byproduct onto the floor area in the absence of an extraction being practiced upon the citrus byproduct.

15. The process according to claim 10, further including formulating the bedding litter composition to have between about 20 and about 100 volume percent of the citrus byproduct, and up to about 80 volume percent of the secondary bedding component.

16. A process for enhancing commercial poultry operations, comprising:
supplying a space for poultry, the space having a floor area;
placing bedding litter onto the floor area, the bedding litter including one or more components of peel byproduct from expressing citrus juice from citrus fruit, the byproduct being in a dried state, the bedding litter has between about 10 and about 100 volume percent of the citrus byproduct, and up to about 90 volume percent of a secondary bedding component other than said citrus byproduct;
supplying poultry in the space and onto the bedding litter, and feeding the poultry; and
removing the poultry from the space and noting a quality characteristic of the poultry, the quality characteristic of said poultry being improved when compared with the same characteristic of poultry placed upon a bedding litter composition of pine wood which is about 100 volume percent pine wood shavings.

17. The process in accordance with claim 16, wherein said byproduct components are selected from the group consisting of pectin, demethylated pectin, and combinations thereof, same having been collected by drying citrus byproduct from juice extraction equipment in the absence of purifying the byproduct component.

18. The process in accordance with claim 16, wherein said byproduct components are selected from the group consisting of citric acid, malic acid, other food grade acids, and combinations thereof, same having been collected by drying citrus byproduct from juice extraction equipment in the absence of purifying the byproduct component.

19. The process in accordance with claim 16, wherein said byproduct components are selected from the group consisting of ascorbic acid, a carotenoid, beta-carotene, beta-cryptoxanthin, lycopene, xanthophyll, and combinations thereof, same having been collected by drying citrus byproduct from juice extraction equipment in the absence of purifying the byproduct component.

20. The process in accordance with claim 16, wherein said byproduct components are selected from the group consisting of naringin, naringenin, narirutin, hesperidin, hespertin, other flavonoids, and combinations thereof, same having been collected by drying citrus byproduct from juice extraction equipment in the absence of purifying the byproduct component.

21. The process in accordance with claim 16, wherein said byproduct components are selected from the group consisting of sinensetin, tangeretin, nobiletin, other polymethoxylated flavones, and combinations thereof, same having been collected by drying citrus byproduct from juice extraction equipment in the absence of purifying the byproduct component.

22. The process in accordance with claim 16, wherein said byproduct components include a tocopherol, same having been collected by drying citrus byproduct from juice extraction equipment in the absence of purifying the byproduct component.

23. The process in accordance with claim 16, wherein said byproduct components are selected from the group consisting of limonin, nomolin, a limonin glucoside, d-limonene, and combinations thereof, same having been collected by drying citrus byproduct from juice extraction equipment in the absence of purifying the byproduct component.

24. The process in accordance with claim 16, wherein said byproduct components include pectin, demethylated pectin, citric acid, malic acid, ascorbic acid, a carotenoid, beta-carotene, beta-cryptoxantin, lycopene, xanthophyll, naringin, naringenin, narirutin, hesperidin, hespertin, sinensetin, tangeretin, nobiletin, a tocopherol, limonin, nomolin, a limonin glucoside, and d-limonene.

25. The process in accordance with claim 16, wherein said byproduct components includes a pectin, a food grade acid, ascorbic acid, a carotenoid, a citrus originating flavonoid, a citrus originating polymethoxylated flavone, and a tocopherol.

* * * * *